Oct. 29, 1946.  P. P. HORNI  2,410,030
VEHICLE MOUNTED FRUIT PICKER
Filed April 7, 1945  2 Sheets-Sheet 2

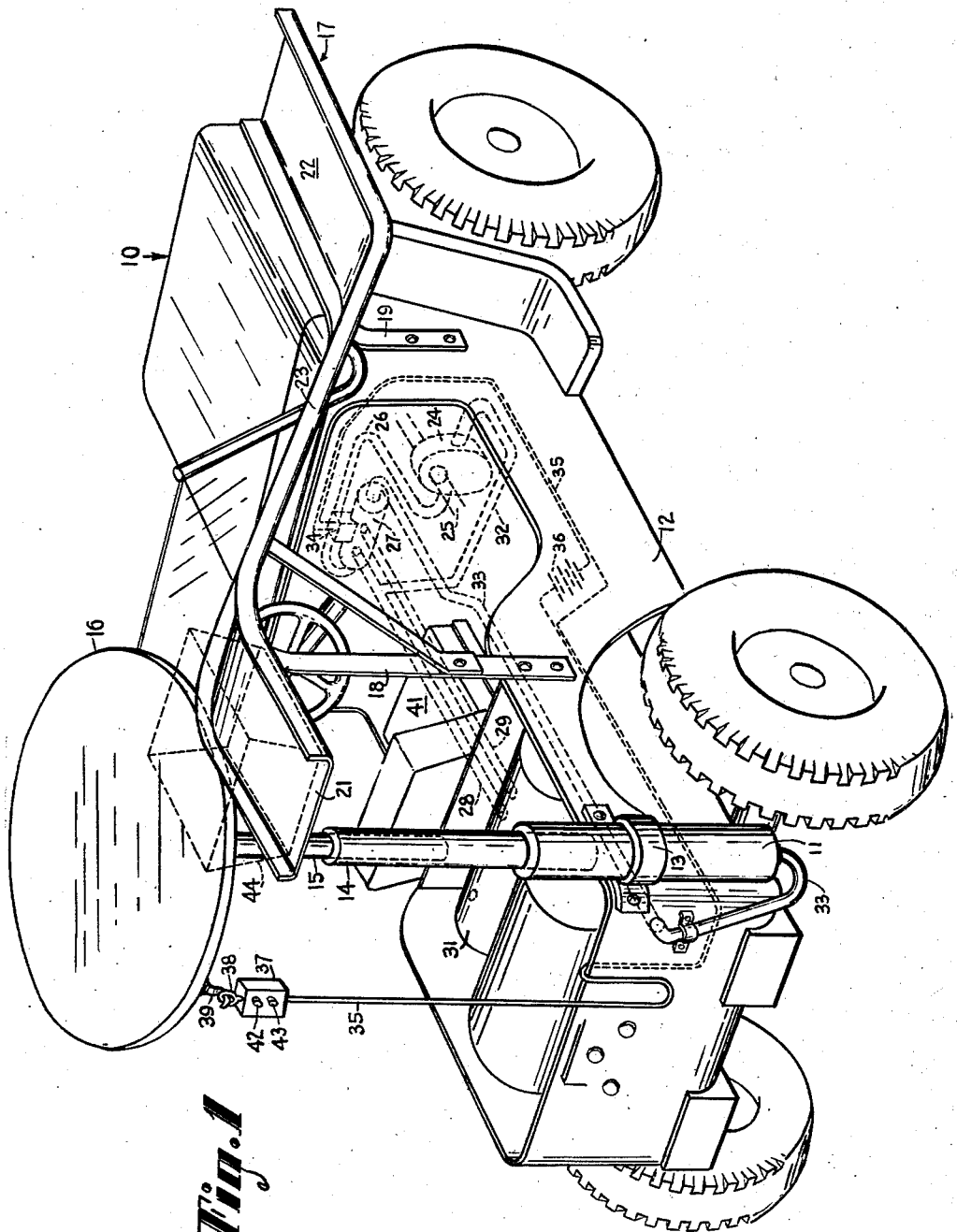

PAUL P. HORNI
INVENTOR.
BY C. Fr. Wm. Forssberg
ATTORNEY.

Patented Oct. 29, 1946

2,410,030

UNITED STATES PATENT OFFICE 2,410,030

VEHICLE MOUNTED FRUIT PICKER

Paul P. Horni, Newark, N. J.

Application April 7, 1945, Serial No. 587,066

6 Claims. (Cl. 304—9)

My present invention relates to a vehicle provided with a hydraulic lift or elevator for supporting a fruit picker, and a fruit basket chute secured upon the vehicle at one side of the elevator structure within convenient reach of the picker.

The main object of my invention is to provide transportable apparatus facilitating the picking of fruits from the trees in an orchard and conveniently depositing the fruits in a box or basket at one level and when the basket is filled, sliding or shifting said basket with the fruit to a lower level at which the basket may be transferred onto a loading platform or truck for transportation to the market.

Another object is to attach a hydraulic lift or elevator to a vehicle and also an inclined chute structure to the same vehicle, so that a fruit picker may stand at various elevations and reach fruits hanging at various heights upon the trees and dispose of the picked fruits safely to prevent damage to the latter.

A further object is to simplify the picking of fruits in general so that the same may be deposited directly from the trees into containers or baskets for the market without exposing the fruits to shocks or violent injurious contact with each other.

Yet another object is to have a suitable platform upon the elevator for supporting the fruit picker and accessible control means for raising or lowering the platform to desired elevation at will while the picker remains on said platform.

It is also an object to apply guard means to the elevator platform to ensure the safety of the fruit picker.

Other objects and advantages of my invention will appear more fully in detail as the specification proceeds.

Figure 3:
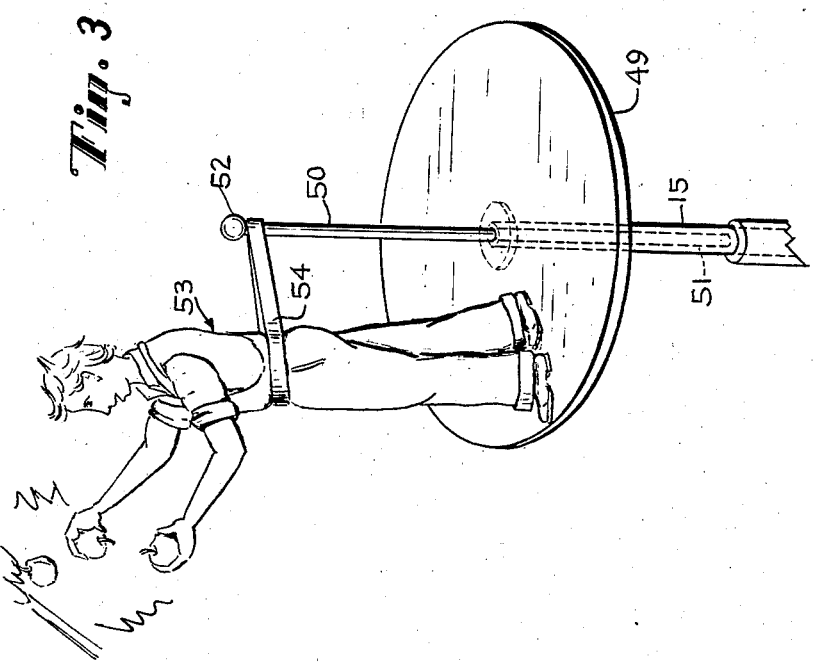
Figure 2:
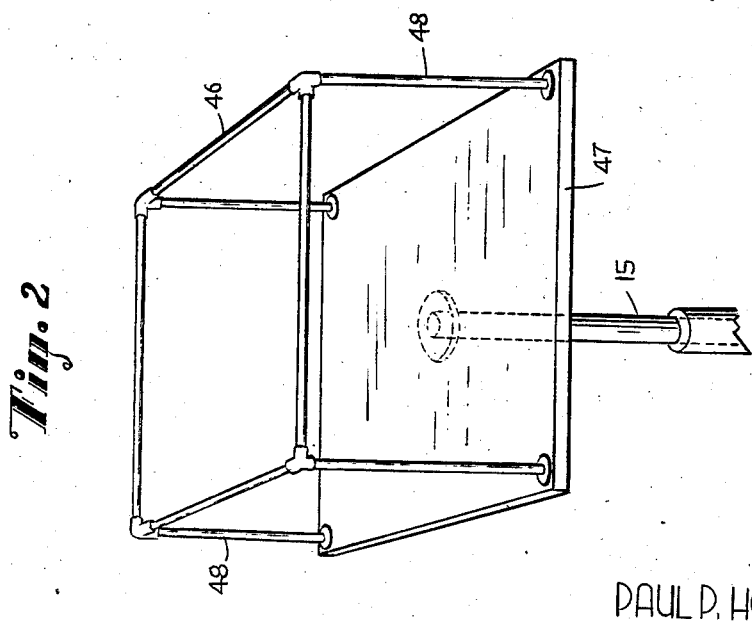

In order to set forth the salient features of the invention in comprehensible form, it is illustrated in the accompanying drawings, in which Fig. 1 is a perspective view of a self-propelled vehicle equipped with apparatus embodying my invention in a practical form;

Fig. 2 is a fragmentary view showing a modification of the elevator platform; and Fig. 3 is somewhat similar fragmentary view showing another modification of the elevator platform.

Throughout the views, the same references indicate the same or like parts.

In orchards and districts devoted to fruit raising, it has long been recognized that the harvesting or gathering of the ripe or near-ripe fruit must be done with sufficient care to avoid bruising or in any way damaging the fruit in order to obtain the best prices for perfect fruit. Usually, the fruit pickers have climbed ladders to reach the fruit hanging on the trees involved and then deposited the fruit picked in baskets which they would climb down the ladders to bring to the ground, or other expedients of more or less convenient nature would be resorted to. The result has often been loss of time due to hand work, inconvenience, and considerable damaged fruit.

I now therefore propose to eliminate ladders and other more or less dangerous or troublesome structures and expedients and instead provide a transportable lift or elevator for the fruit picker in combination with an inclined fruit basket chute, capable of being moved from tree to tree in an orchard and render the operation of picking fruit convenient, efficient and reasonably safe.

Hence, with the foregoing objects in view, and in order to avoid the disadvantages above alluded to, I prefer to provide a self-propelled vehicle, generally indicated at 10 with a hydraulic lift or elevator cylinder 11 secured to the rear of one side of the vehicle body 12 by a metal strap 13 attached by any known means so that the cylinder will be firmly held. A tubular piston 14 projects slidably into the upper end of the cylinder and in similar fashion a plunger 15 extends slidably into the upper end of piston 14, so that if pressure fluid is admitted to the interior of the cylinder, both pistons will tend to rise and project vertically to a predetermined extent from the cylinder. The plunger 15 is surmounted by a disk-shaped elevator platform 16 fixed thereto and adapted to support a fruit picker at various elevations, the elevation or position of the picker or operator being a matter of choice and subject to his control, as will presently be explained in connection with the operation of the elevator with its platform.

However, at this juncture it may be well to consider another feature of construction which is combined with the elevator. Thus, upon the same side of the vehicle body 12 with said elevator is fixed a fruit basket chute generally indicated at 17, two supporting brackets 18, 19 being directly screwed or bolted to the body 12 and riveted or bolted or even welded or brazed to the chute. The latter consists of an upper loading ledge 21, a lower landing ledge 22 and an inclined intermediate chute portion 23 connecting smoothly between both upper and lower ledges into a unit. The upper ledge is adapted to support a fruit box or basket in a position conveniently accessible to the fruit picker standing on the elevator platform, so that he is able to carefully deposit the fruits picked directly into the basket on said ledge without throwing or dropping said fruits into said basket or damaging them during picking thereof. When the basket is full, a slight push will cause it to slide down along the inclined chute and come to rest upon the lower ledge 22 in accessible position for removal to a truck or to a loading platform or the like.

In order to operate the elevator a fluid pump 24 is constantly driven by the drive or transmission shaft 25 rotated by the motor or engine (not shown) of the vehicle, one pipe 26 leading from the pump to a special slide valve 27 which is connected by two pipes 28, 29 to a fluid reservoir or tank 31, the other pipe 32 of the pump connecting with an intermediate portion of pipe 28 and thus with another portion of the valve, while the latter is connected by the pressure fluid pipe 33 to the lower portion of hydraulic cylinder 11. An electromagnetic valve shifting device 34 is associated with the valve structure and connected by a cable 35 to a battery or other source of current 36 and to a button control block 37 having a loop or screw eye 38 by which it is removably suspended from a hook 39 secured beneath platform 16 in a position to be conveniently accessible to a person standing on said platform, and yet out of the way to a sufficient extent to avoid personal injury or damage to the clothing of the operator.

The arrangement is such, that when the operator or fruit picker has driven the vehicle to the intended location where the fruit is to be picked, and steps upon the seat 41 and thence upon the platform 16 in a lowered position of the latter, pressing button 42 will cause the electromagnetic device to shift the interior valve member into one extreme position in which it opens communication between pipes 26 and 33 but closes off pipes 28 and 29 at the valve. The latter is but diagrammatically indicated here, although fully illustrated and described in detail in my copending application, Serial No. 585,782, filed March 30, 1945, entitled "Swiveling elevator and chute for self-propelled vehicles," filed simultaneously herewith. It is, of course assumed that the operator keeps the engine of the vehicle running so that the pump 24 draws fluid from tank 31 through pipes 28 and 32 and drives the fluid through pipe 26, valve 27 and pipe 33 into cylinder 11. As the pressure fluid is thus introduced into said cylinder, the piston 14 and plunger 15 immediately begin to rise, raising platform 16 with the operator standing on it as long as the button 42 is pressed.

When the operator has risen to desired height, he releases the upper button and the valve automatically assumes an intermediate neutral position in which pressure fluid pipe 33 is closed off at the valve and the latter provides communication between pipes 26 and 28 so as to allow fluid to circulate idly through the pump and pipes 26, 28 and 32 while the elevator platform is solidly supported in stationary position because pressure fluid cannot escape from cylinder 11 nor is any fluid supplied thereto. The platform being disposed at the proper height for a work cycle, the operator proceeds to pick the fruit within reach and deposits the same in a box or basket 44 resting on the upper ledge or landing 21 of the chute 17. When the basket has been filled, a gentle push by the operator will cause it to slide down the inclined chute portion 23 and come to rest on the bottom ledge or landing, as already outlined. In the meantime, a new box or basket is placed in position upon upper landing 21 and then filled with fruit and thereafter slid down to the lower landing and removed and shipped to the market.

As soon as the fruit has been picked at one level, the operator by removing control block 37 from hook 39 and pressing upper button 42 to raise the platform to a higher level for gathering fruit from the tree which was previously out of reach, and after the control block has been returned to hook 39, the fruit is picked for deposit of same in successive fruit baskets on the upper chute landing. When the work is finished at one location, the operator again takes up the control block and presses button 43, whereupon the electromagnetic device 34 will cause the valve in valve casing 27 to shift in the opposite direction than it did when the upper button was pressed. The result is that the valve provides communication between pipe 29 leading to reservoir 31 and pipe 33 leading from the hydraulic cylinder 11, so that the platform 16 and telescoping piston 14 and plunger 15 will descend by gravity and thereby force pressure fluid from cylinder 11 into the reservoir through said pipes 29 and 33 until the platform has reached its lowest intended position. The valve also maintains the communication between pipes 26, 28 and 32. The lower button is then released and the operator steps off the platform onto the seat 41 and thereafter seats himself and drives the apparatus to the next location where the operation is repeated.

It is of course possible to include safety devices for preventing accidents, especially for preventing the operator from falling off the platform at it highest elevation. In Figure 2, the platform 45 is shown with a closed guard rail 46 serving both as a support against which the operator may lean when working as well as a guard rail to prevent him from losing his balance and falling off when he reaches out too far after some fruit. The platform 47 in this case is also illustrated as being substantially square and the rail 46, which may be formed of metal bars, rods or piping is supported by corner posts 48, 48, etc.

On the other hand, as shown in Figure 3, the platform 49 is provided with a center post 50 which may either be an extension of plunger 15 through the platform or may be a distinct pipe or rod structure extending down into a hollow portion 51 in the plunger and terminating at the top in a fixed knob or cap 52. The operator 53, in this case, may either grasp the center post with one hand and thus hold himself positively on the platform while picking the fruit with the other hand, or he may be held by a belt 54 looped around his body and about post 50. In the latter case, the operator's hands are both free for fruit picking, the knob 52 on the post preventing accidental disengagement of the belt from said post.

From the foregoing is readily seen that a farmer or fruit picker may drive the apparatus embodying the invention to a fruit orchard and quickly and safely harvest the fruit in convenient and efficient manner so that the fruit may be presented as quickly as possible and in the best possible condition to the market. It is also true that the facilities of the invention greatly reduce labor and speed up the picking of the fruit and likewise substantially eliminate loss of fruit through damage thereto.

It is manifest that modifications of the invention may be resorted to, and parts may be used without others, within the spirit and scope of the appended claims.

As illustrative of the modifications possible, it may be mentioned that the cable 35 need not hang slack but a conventional cable reel or a hollow receptacle may be mounted on the rear of the vehicle body to receive the slack of the cable at all times. Also the pump 24 may be of any known type.

Having now fully described my invention, I claim:

1. In a vehicle mounted fruit picker in which a self-propelled vehicle provided with a frame has an operable elevator supported thereon surmounted by a platform, control means for operating the elevator to raise and lower the platform at will, and means comprising a support for a fruit receptacle or basket, the combination of features which consists in having the fruit receptacle support rigidly secured to one side of the frame so as to support said receptacle independently of said elevator platform, and having the elevator secured upon the same side of said frame in effective position to dispose the platform of said elevator adjacent to at least one side portion of said fruit receptacle support and allow said platform to at least approach the level of the latter during raising and lowering thereof.

2. Apparatus according to claim 1, in which the fruit receptacle support comprises an inclined chute having an upper landing at the upper end thereof for supporting the receptacle at an elevated level and a relatively lower landing at the other end for receiving and supporting said receptacle in a final low position.

3. Apparatus according to claim 1, in which the fruit receptacle support comprises an inclined chute for the container disposed upon one side of the vehicle frame, and having the hydraulic cylinder mounted rearwardly upon said one side of said vehicle frame.

4. Apparatus according to claim 1, in which the control means comprises a manual control member and an electrical operating member connected to the latter and controlled thereby and capable of controlling introduction of pressure fluid into, retention of fluid in, and release of fluid from, the hydraulic elevator at will by manipulation of said control member.

5. Apparatus according to claim 1, in which the fruit receptacle support comprises an inclined chute having an upper landing at the upper end thereof for supporting the receptacle at an elevated level and a relatively lower landing at the other end for receiving and supporting said receptacle in a final low delivery position, the two landings being substantially horizontal and the upper landing being disposed adjacent to and outside the hydraulic elevator in a position allowing the platform of said elevator to be raised and lowered past said upper landing.

6. Apparatus according to claim 1, in which the control means includes a manual control member, an electrical operating member connected to the latter and controlled thereby and capable of controlling operation of the hydraulic elevator upon manipulation of said manual control member, and in which the manual control member is movable and comprises a manually held block with a plurality of push buttons thereon for individually causing raising and lowering of the elevator platform and a flexible conducting cable connecting said block to said electrical operating member, while said block has an engagement member and the platform has a corresponding engagement member for detachably supporting said block when the elevator is idle.

PAUL P. HORNI.